United States Patent
Zhang

(10) Patent No.: US 11,362,717 B2
(45) Date of Patent: Jun. 14, 2022

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Zhi Zhang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/168,082

(22) Filed: Feb. 4, 2021

(65) Prior Publication Data

US 2021/0159962 A1 May 27, 2021

Related U.S. Application Data

(63) Continuation of application No. PCT/CN2018/122886, filed on Dec. 21, 2018.

(30) Foreign Application Priority Data

Aug. 15, 2018 (WO) ............... PCT/CN2018/100722

(51) Int. Cl.
*H04B 7/06* (2006.01)
*H04L 5/00* (2006.01)
(Continued)

(52) U.S. Cl.
CPC ......... *H04B 7/0689* (2013.01); *H04L 5/0051* (2013.01); *H04L 5/1469* (2013.01); *H04W 52/028* (2013.01)

(58) Field of Classification Search
CPC ............... H04B 7/0689; H04B 7/0602; H04B 2001/045; H04B 1/04; H04B 7/0802;
(Continued)

(56) References Cited

U.S. PATENT DOCUMENTS

| 8,909,283 B2 | 12/2014 | Park et al. |
| 2013/0044650 A1 | 2/2013 | Barker et al. |

(Continued)

FOREIGN PATENT DOCUMENTS

| CN | 102065574 A | 5/2011 |
| CN | 102355728 A | 2/2012 |

(Continued)

OTHER PUBLICATIONS

OPPO. "Further discussion on additional IL caused by SRS switch" 3GPP TSG-RAN WG4 Meeting #88bis, R4-1812719, Oct. 12, 2018 (Oct. 12, 2018), sections 1-3.

(Continued)

*Primary Examiner* — Thai Nguyen
(74) *Attorney, Agent, or Firm* — Perkins Coie LLP

(57) ABSTRACT

A wireless communication method and device are provided. The method comprises the following operations. A terminal device sends first information to a network device. The first information indicates a switching mode supported by the terminal device and/or a performance parameter value corresponding to the supported switching mode, the switching mode indicates a manner in which the terminal device switches from one transmission mode to another transmission mode, and the transmission mode indicates the number of transmitters and the number of receivers used by the terminal device.

18 Claims, 3 Drawing Sheets

(51) Int. Cl.
*H04L 5/14* (2006.01)
*H04W 52/02* (2009.01)

(58) Field of Classification Search
CPC ... H04B 1/1615; H04L 5/0051; H04L 5/1469; H04L 5/0023; H04W 52/028; H04W 72/048; H04W 8/24
See application file for complete search history.

(56) References Cited

U.S. PATENT DOCUMENTS

| | | | |
|---|---|---|---|
| 2013/0078931 A1 | 3/2013 | Jerng et al. | |
| 2013/0089044 A1 | 4/2013 | Park et al. | |
| 2014/0086071 A1* | 3/2014 | Hu | H04B 7/0689 370/252 |
| 2015/0222318 A1 | 8/2015 | Jerng et al. | |
| 2016/0261326 A1 | 9/2016 | Barker et al. | |
| 2021/0281301 A1* | 9/2021 | Takano | H04B 7/0691 |

FOREIGN PATENT DOCUMENTS

| | | |
|---|---|---|
| CN | 103975633 A | 8/2014 |
| WO | 2017194829 A1 | 11/2017 |

OTHER PUBLICATIONS

OPPO. "Discussion on additional IL caused by SRS switch" 3GPP TSG-RAN WG4 Meeting #88, R4-1810553, Aug. 10, 2018 (Aug. 10, 2018), sections 1-3, and figures 1-3.
OPPO. "Introduction of SRS switch IL for 4.9GHz" 3GPP TSG-RAN WG4#88, R4-1810551, Aug. 10, 2018 (Aug. 10, 2018), entire document.
Hua Wei et al. "Partial reciprocity based CSI acquisition mechanism" 3GPP TSG RAN WG1 Meeting #90, R1-1714338, Aug. 25, 2017 (Aug. 25, 2017), entire document.
International Search Report in the international application No. PCT/CN2018/122886, dated May 17, 2019.
Nokia et al."SRS switching UE capability",3GPP Draft; R1-167716, Aug. 21, 2016, XP051126050. 2 pages.
Qualcomm Incorporated:"SRS antenna switching for 1T4R and 2T4R",3GPP Draft; R1-1804937 SRS Antenna Switching Apr. 15, 2018,XPOS 1427200. 8 pages.
Huawei et al:"SRS antenna switching",3GPP Draft; R1-1709938, Jun. 26, 2017, XP051299163. 4 pages.
Supplementary European Search Report in the European application No. 18930139.3, dated Aug. 12, 2021. 10 pages.
Office Action of the Indian application No. 202127009958, dated Sep. 15, 2021. 7 pages with English translation.
Written Opinion of the International Search Authority in the international application No. PCT/CN2018/122886, dated May 17, 2019. 9 pages with English translation.
International Search Report in the international application No. PCT/CN2018/100722, dated Apr. 4, 2019. 9 pages with English translation.
Written Opinion of the International Search Authority in the international application No. PCT/CN2018/100722, dated Apr. 4, 2019. 10 pages with English translation.

\* cited by examiner

A terminal device sends first information to a network device, the first information indicates a switching manner supported by the terminal device and/or a performance parameter value corresponding to the supported switching manner, the switching manner indicates a manner for switching the terminal device from one transmission mode to another transmission mode, and the transmission mode indicates the number of transmitters and the number of receives used by the terminal device — S410

FIG. 5

A network device receives first information sent by a terminal device, the first information indicates a switching manner supported by the terminal device and/or a performance parameter value corresponding to the supported switching manner, the switching manner indicates a manner for switching the terminal device from one transmission mode to another transmission mode and the transmission mode indicates the number of transmitters and the number of receivers used by the terminal device — S510

FIG. 6

Under a condition that the terminal device sends an uplink signal on the first antenna, the terminal device turns on the first PA and turns off the second PA; or, under a condition that the terminal device sends an uplink signal on the second antenna, the terminal device turns on the second PA and turns off the first PA — S610

FIG.7

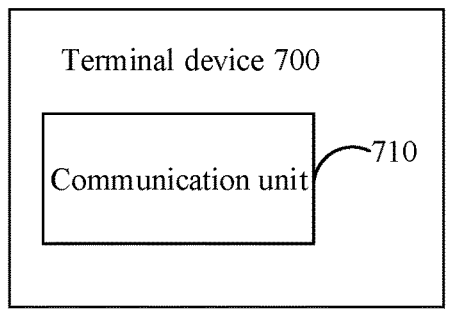

FIG. 8

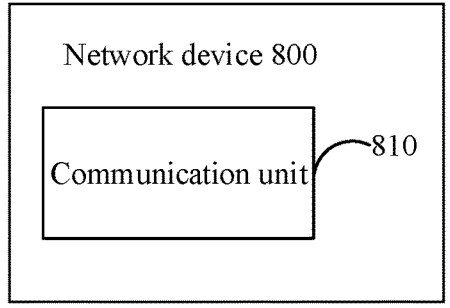

FIG. 9

WIRELESS COMMUNICATION METHOD AND DEVICE

CROSS-REFERENCE TO RELATED APPLICATIONS

This is a continuation application of International Patent Application No. PCT/CN2018/122886, filed on Dec. 21, 2018, which claims priority to International Patent Application No. PCT/CN2018/100722, filed on Aug. 15, 2018, the contents of which are hereby incorporated by reference in their entireties.

BACKGROUND

In a Long Term Evolution (LTE) system, a fixed transmission mode is used by a terminal device for sending a Sounding Reference Signal (SRS). For example, one transmitter and two receivers may be used by the terminal device, i.e., a 1Tx-2Rx (1T2R) mode is used to send the SRS.

For a New Radio (NR) system, the NR system has a relatively high requirement on communication flexibility. For example, taking an SRS as an example, how a terminal device improves the flexibility of a communication system while transmitting the SRS becomes a problem urgent to be solved.

SUMMARY

The disclosure relates to the field of communication, and more particularly to a wireless communication method and device, in order for improving the flexibility of a communication system.

A first aspect of the embodiments provides a wireless communication method, which may include operations as follows. A terminal device sends first information to a network device. The first information indicates a switching manner supported by the terminal device and/or a performance parameter value corresponding to the supported switching manner, the switching manner indicates a manner for switching the terminal device from one transmission mode to another transmission mode, and the transmission mode indicates the number of transmitters and the number of receivers used by the terminal device.

A second aspect of the embodiments provides a terminal device, which may include a processor, a memory and a transceiver. The memory may be configured to store a computer program, and the processor may be configured to call and run the computer program stored in the memory to control the transceiver to send first information to a network device. The first information indicates a switching manner supported by the terminal device and/or a performance parameter value corresponding to the supported switching manner, the switching manner indicates a manner for switching the terminal device from one transmission mode to another transmission mode, and the transmission mode indicates the number of transmitters and the number of receivers used by the terminal device.

BRIEF DESCRIPTION OF THE DRAWINGS

FIG. 5 is a schematic block diagram of a wireless communication method according to an embodiment of the disclosure.

FIG. 6 is a schematic block diagram of a wireless communication method according to an embodiment of the disclosure.

FIG. 7 is a schematic block diagram of a method for transmitting an uplink signal by a terminal device according to an embodiment of the disclosure.

FIG. 8 is a schematic block diagram of a terminal device according to an embodiment of the disclosure.

FIG. 9 is a schematic block diagram of a network device according to an embodiment of the disclosure.

DETAILED DESCRIPTION

The technical solutions in the embodiments of the disclosure will be clearly and completely described below in combination with the drawings in the embodiments of the disclosure.

The technical solutions of the embodiments of the disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), an Advanced LTE (LTE-A) system, an NR system, an evolved system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation communication system or another communication system.

An application spectrum is not limited in the embodiments of the disclosure. For example, the embodiments of the disclosure may be applied to a licensed spectrum and may also be applied to an unlicensed spectrum.

Figure 1:
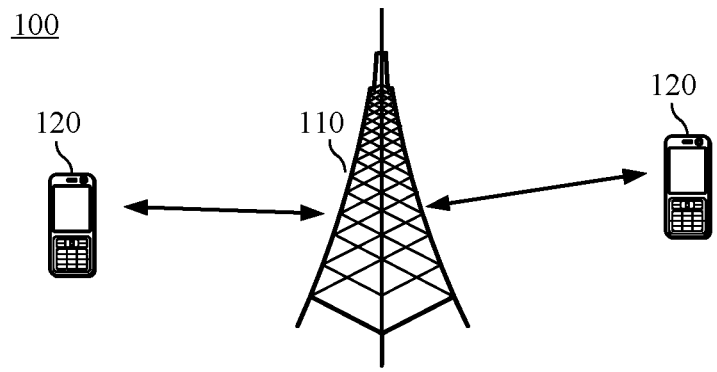
FIG. 1 is a schematic diagram of architecture of a communication system according to an embodiment of the disclosure.

FIG. 1 illustrates a wireless communication system 100 to which the embodiments of the disclosure are applied. The wireless communication system 100 may include a network device 110. The network device 110 may be a device communicating with a terminal device. The network device 110 may provide communication coverage for a specific geographical region and may communicate with a terminal device (for example, User Equipment (UE)) in the coverage. Optionally, the network device 110 may be a Base Transceiver Station (BTS) in the GSM or the CDMA system, may also be a NodeB (NB) in the WCDMA system, and may further be an Evolutional Node B (eNB or eNodeB) in the LTE system or the NR system or a wireless controller in a Cloud Radio Access Network (CRAN). Alternatively, the network device may be a relay station, an access point, a vehicle-mounted device, a wearable device, a network-side device in a 5th-Generation (5G) network, a network device in a future evolved Public Land Mobile Network (PLMN) or the like.

The wireless communication system 100 further includes at least one terminal device 120 within the coverage of the network device 110. The terminal device 120 may be mobile or fixed. Optionally, the terminal device 120 may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, an on-vehicle device, a wearable device, a terminal device in the future 5G network, a terminal device in the future evolved PLMN or the like. Optionally, the terminal device 120 may also perform Device to Device (D2D) communication.

Optionally, the 5G system or network may also be called an NR system or network.

One network device and two terminal devices are exemplarily shown in FIG. 1. Optionally, the wireless communication system 100 may include multiple network devices and another number of terminal devices may be included in coverage of each network device, which is not limited in the embodiments of the disclosure.

Optionally, the wireless communication system 100 may further include another network entity such as an Access and Mobility Management Function (AMF), a Session Management Function (SMF), Unified Data Management (UDM) and an Authentication Server Function (AUSF), which is not limited in the embodiments of the disclosure.

In addition, each aspect or characteristic of the disclosure may be embodied as a method, a device or a product programed with a standard and/or using an engineering technology. Term "product" used in the disclosure covers a computer program which may be accessed from any computer-readable device, carrier or medium. For example, the computer-readable medium may include, but be not limited to: a magnetic storage device (for example, a hard disk, a floppy disk or a magnetic tape), an optical disk (for example, a Compact Disc (CD) and a Digital Versatile Disc (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but be not limited to, various media capable of storing, including and/or bearing instructions and/or data.

It is to be understood that terms "system" and "network" in the disclosure may usually be exchanged in the disclosure. In the disclosure, the term "and/or" herein only represent an association relationship of associated objects, which means that there may be three relationships. For example, A and/or B can mean: only A exists, both A and B exist, and only B exists. In addition, the character "/" herein generally indicates that there is an "or" relationship between two associated objects.

During signal transmission, a terminal device may adopt a transmission mode for signal transmission. The transmission mode may refer to the number of transmitters and the number of receivers used by the terminal device. For example, the terminal device may use a certain number of transmitters for signal sending and may also adopt a certain number of receivers for signal reception.

Optionally, the transmission mode may also be any one of the following modes: 1T4R, 1T2R and 2T4R.

For example, in a 1T4R scenario, the terminal device may use one transmitter for signal sending and use four receivers for signal reception. The terminal device using one transmitter for signal sending may refer to that the terminal device uses one transmitter for signal sending during an uplink transmission.

4R may refer to that the terminal device includes the four receivers, and the terminal device, when receiving downlink signals, may use the four receivers to simultaneously receive the downlink signals.

Of course, the terminal device may also include more receivers, and the terminal device, when receiving the downlink signals, may use four of the receivers to receive the downlink signals.

1T may refer to that the terminal device uses one transmitter during the same uplink transmission. However, this does not mean the terminal device uses only one transmitter for signal sending and the terminal device may send uplink signals in turns or alternately on multiple transmitters.

The same transmission may also be understood as an uplink transmission performed by the terminal device at the same time. 1T may refer to that the number of transmitters used by the terminal device for sending an uplink signal at the same time is 1.

For another example, in a 2T4R scenario, the terminal device may use two transmitters for signal sending and use four receivers for signal reception. For another example, in a 1T2R scenario, the terminal device may use one transmitter for signal sending and use two receivers for signal reception.

4R may refer to that the terminal device includes the four receivers, and the terminal device, when receiving downlink signals, may use the four receivers to simultaneously receive the downlink signals.

Of course, the terminal device may also include more receivers, and the terminal device, when receiving the downlink signals, may adopt four of the receivers to receive the downlink signals.

2T represents that the terminal device uses two transmitters during the same uplink transmission. However, this does not mean the terminal device uses only two transmitters for signal sending and the terminal device may send uplink signals in turns or alternately on multiple transmitters. For example, for a terminal device with four transmitters, two of the transmitters may be used for current transmission, and the other two transmitters may be used for next transmission.

The same transmission may also be understood as an uplink transmission implemented by the terminal device at the same time. 2T may refer to that the number of transmitters used by the terminal device for sending the uplink signals at the same time is 2.

For another example, in the 1T2R scenario, the terminal device may only support transmission of 1T2R and may also support transmission of both 1T2R and 2T4R.

For a condition that only transmission of 1T2R is supported, the terminal device may include two antennas. When the terminal device receives a downlink signal, the terminal device may adopt the two antennas to receive signals. When the terminal device sends an uplink signal, the terminal device may adopt one antenna in the two antennas to send a signal.

For a condition that both transmission of 1T2R and transmission of 2T4R are supported, the terminal device may include two 1T2R structures. When 1T2R is used for transmission, the terminal device may use one 1T2R structure in the two 1T2R structures for transmission. When the terminal device uses one 1T2R structure for signal transmission, the other 1T2R structure may be switched off. For example, for a condition that the two 1T2R structures are independently powered, the terminal device may power off the other 1T2R structure.

It is to be understood that an antenna of the transmitter and an antenna of the receiver may be the same antenna and may also be different antennas.

Under a condition that the antenna of the transmitter and the antenna of the receiver are the same antenna, the terminal device may operate in a TDD mode. Since the transmitter and the receiver operate at different time, the same antenna may be used for signal reception and signal sending.

For example, in the 1T4R scenario, the terminal device may include four antennas. When the terminal device receives a signal, the four antennas are used by the receivers to receive signals. When the terminal device sends a signal, one antenna in the four antennas is used by the transmitter to transmit a signal. Generally, if an antenna 1 is a main antenna, the terminal device, when sending a signal, preferentially uses the antenna 1 to send a signal.

For example, in the 2T4R scenario, the terminal device may include four antennas. When the terminal device receives a signal, the four antennas are used by the receivers to receive signals. When the terminal device sends a signal, two antennas of the four antennas are used by the transmitters to transmit signals.

It is to be noted that, for the TDD mode, the terminal device sends an uplink signal to a network device, and the uplink signal may be used by the network device to estimate quality of a downlink channel, so that the network device may make a correct communication decision to ensure good communication between the terminal device and the network device.

For a TDD scenario, the receiver and the transmitter are in the same frequency and operate to transmit uplink and downlink information in different slots, and the receiver and the transmitter are separated by time. In the TDD mode, it may be considered that channel reciprocity exists in an uplink and a downlink of the terminal device.

Generally, when the terminal device operates in a TDD mode, the terminal device may send an uplink signal to the network device, and the network device, after receiving the uplink signal, may measure quality of a downlink channel according to signal quality of the received uplink signal. This is called the channel reciprocity. The terminal device may switch between the receiver and the transmitter, and the network device can know a characteristic of the downlink channel by use of the channel reciprocity. The network device may estimate a channel characteristic of the downlink channel according to a channel characteristic of the received uplink signal sent by the terminal device.

For a Multiple-Input Multiple-Output (MIMO) system, when the network device expects to perform MIMO transmission, especially 4*4 MIMO or higher-order MIMO, the network device may require the terminal device to send an uplink signal using a receiver of the terminal device, such that the network device may determine a channel state of the downlink channel through the uplink signal, which facilitates downlink MIMO transmission of the network device.

Under a condition that the antenna of the transmitter and the antenna of the receiver are different antennas, the terminal device may use different antennas to perform signal sending and reception. Under this condition, the terminal device may operate in the TDD mode and may also operate in an FDD mode.

For example, for the 1T2R scenario, the terminal device may include four antennas, and the terminal device may use two antennas for signal reception and uses the other two antennas for signal sending.

Under some conditions, for example, in order for power saving, the terminal device is required to reduce the number of the transmitters and/or the receivers.

For example, under some conditions, the terminal device is required to be switched from two transmitters to one transmitter, namely switching from 2T to 1T. For another example, the terminal device is required to be switched from four receivers to two receivers, namely switching from 4R to 2R. For another example, the terminal device is also required to be switched from two transmitters to one transmitter while being switched from four receivers to two receivers, namely switching from 2T4R to 1T2R.

Such a transmission mode switching manner of reducing the number of transmitters and/or the number of receivers may also be called transmission mode fallback. For example, switching from 2T to 1T can be understood as falling back from 2T to 1T, and switching from 4R to 2R can be understood as falling back from 4R to 2R.

Of course, besides transmission mode fallback, the terminal device may also perform another transmission mode switching, for example, switching from 1T to 2T or switching from 2R to 4R.

The uplink signal may be an uplink data signal and may also be an uplink control signal or a reference signal, which is not limited in the embodiments of the disclosure. The uplink signal may be carried in a Physical Uplink Control Channel (PUCCH) or a Physical Uplink Shared Channel (PUSCH).

Optionally, the uplink signal may be an SRS. The SRS may be sent by the terminal device and received by the network device, and may be used to measure quality of an uplink channel.

Optionally, the terminal device may send uplink signals in turns on multiple receivers, and the network device may estimate a channel state of the corresponding receiver according to each received uplink signal, so that the network device may regulate transmit power of a downlink signal and the like according to the channel state of the receiver.

Figure 2:
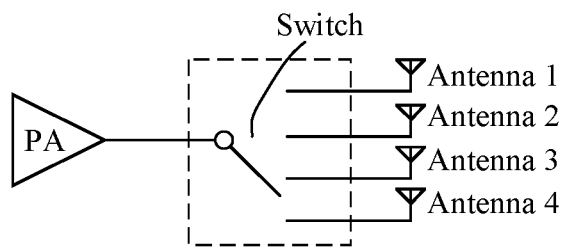
FIG. 2 is a schematic diagram of a transmission mode according to an embodiment of the disclosure.
Figure 3:
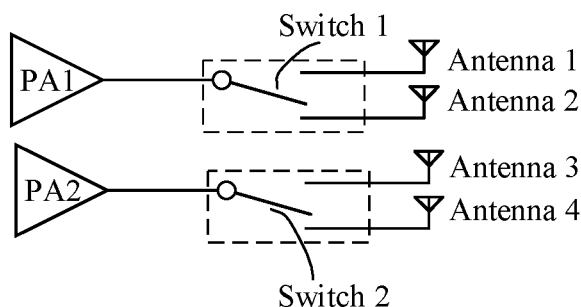
FIG. 3 is a schematic diagram of another transmission mode according to an embodiment of the disclosure.

FIG. 2 and FIG. 3 illustrate three basic transmission modes, which are described in detail below.

FIG. 2 shows a 1T4R transmission mode. As shown in FIG. 2, the terminal device includes four antennas, i.e., an antenna 1, an antenna 2, an antenna 3 and an antenna 4. The terminal device may receive a downlink signal and send an uplink signal through the four antennas. When the terminal device is to receive a signal, the four antennas may operate simultaneously to receive signals. When the terminal device is to send an uplink signal, the terminal device may be switched to any one of the four antennas through a switching switch to send a signal. A power amplifier in FIG. 2 may amplify power of a signal to be sent and send the amplified signal to the network device.

The antenna 1 shown in FIG. 2 is a main antenna, and the terminal device usually sends an uplink signal through the antenna 1. The embodiments of the disclosure are not limited thereto. For example, when the uplink signal is an SRS, the terminal device may send the SRS using any one of the four antennas.

Optionally, the terminal device may send an uplink signal in turns on the four antennas. The terminal device may send four uplink signals to the network device, and different antennas are used for sending the four uplink signals. In the TDD mode, the network device, after receiving the four uplink signals, may estimate channel quality of each downlink channel according to quality of a received signal, which facilitates making a correct communication by the network device. For example, a transmit power for sending a downlink signal is determined, which is favorable for ensuring good communication between the terminal device and the network device.

FIG. 3 shows a schematic structural diagram of 1T2R and 2T4R. Each block shown in FIG. 3 shows one 1T2R structure. For each 1T2R structure, the terminal device may switch between two antennas to send an uplink signal. When the terminal device is to send an uplink signal, uplink signals are usually sent through the antenna 1 and the antenna 3, and the antenna 1 and the antenna 3 may also be called main antennas. The two 1T2R structures may be combined to a 2T4R structure, and the terminal device may switch between four receivers to send the uplink signals. Since the 2T4R structure is formed by the two 1T2R structures, for the transmitter, each PA may be switched to two receivers to send the SRS only.

Specifically, for a PA1, the PA1 may be switched to the antenna 1 or the antenna 2 to send an uplink signal. For a PA2, the PA2 may be switched to the antenna 3 or the antenna 4 to send an uplink signal.

FIG. 2 and FIG. 3 show three structures for the transmission modes, that is, 1T2R structure, 1T4R structure and 2T4R structure. Besides the three basic types, there is another type of terminal device which supports both 1T4R and 2T4R. This type of terminal device is capable of supporting 2T4R, and then falls back to a condition of only one transmitter in some cases. For example, when power saving is required, the terminal device may fall back from 2T4R to 1T2R or 1T4R, thereby achieving the purpose of power saving.

When the terminal device is to fall back from 2T4R to 1T4R, the terminal device is required to support transmission of both 2T4R and 1T4R. Of course, this terminal device is required to support transmission of 2T4R at first.

The embodiments of the disclosure provide a mode switching manner, to switching the terminal device from 2T4R to 1T4R.

A structure of the terminal device which supports both 1T4R and 2T4R is not limited in the embodiments of the disclosure.

As an example, the terminal device may achieve the purpose of supporting both 1T4R and 2T4R in a cascaded switch switching manner.

As shown in FIG. 3, all of the antenna 1, the antenna 2, the antenna 3 and the antenna 4 are receiving antennas of the terminal device, the antenna 1 and the antenna 2 constitute a 1T2R structure, the antenna 3 and the antenna 4 constitute a 1T2R structure, and the two 1T2R structures constitute the 2T4R structure. The antenna 1 and the antenna 2 are connected with the PA1 through a switch 1, the antenna 3 and the antenna 4 are connected with the PA2 through a switch 2, and the PA1 and the PA2 amplify signals on the antennas and send the amplified signals to the network device. When the terminal device sends signals in turns on the antenna 1 and the antenna 2, the signals may be sent by switching of the switch 1. When the terminal device sends signals in turns on the antenna 3 and the antenna 4, the signals may be sent by switching of the switch 2.

However, for the antenna 1 and the antenna 2, the signals are sent through the PA1. For the antenna 3 and the antenna 4, the signals are sent through the PA2. When the terminal device is to send the signals in turns on the antenna 1 to the antenna 4, the terminal device is required to support switching from the PA1 to the PA2.

The embodiments of the disclosure provide a switching manner, to avoid switching of the terminal device between the PA1 and the PA2.

The switching manner is a manner of controlling conducting and non-conducting between a first PA in at least two PAs on transmitters of the terminal device and an antenna on the transmitter, to implement switching from one transmission mode to another transmission mode. The first PA is connected to antennas on multiple transmitters, and the antennas of at least part of the multiple transmitters connected with the first PA include an antenna of a transmitter connected with a second PA in the at least two PAs.

Figure 4:
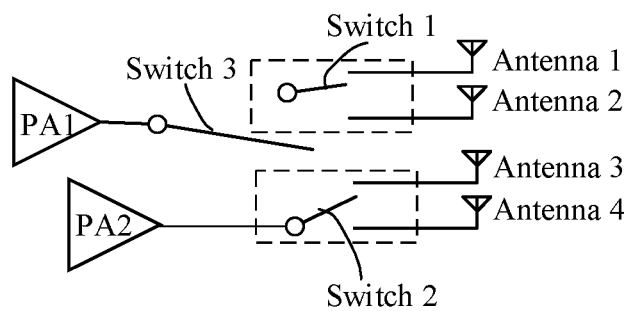
FIG. 4 is a schematic diagram of another transmission mode according to an embodiment of the disclosure.

Specifically, as shown in FIG. 4, a switch 3 may be added between the switch 1 and the switch 2, and a connection between the PA1 and the antenna 3 or the antenna 4 may be established through the switch 3. In this way, under a condition that the switch 3 is switched to be connected to the antenna 3, when the terminal device sends a signal through the antenna 3, the signal may be sent through the PA1. Under a condition that the switch 3 is switched to be connected to the antenna 4, when the terminal device sends a signal through the antenna 4, the signal may also be sent through the PA1.

FIG. 4 only exemplarily illustrates an implementation mode of the cascaded switch, and the embodiments of the disclosure are not limited thereto. For example, the switch 3 may also be connected in another manner.

In addition, according to the solution shown in FIG. 4, connection with the four antennas is implemented through the PA1. In the embodiments of the disclosure, connection with the four antennas may also be implemented through the PA2.

From the above, the terminal device may support transmission of 1T4R by adding the cascaded switch.

Of course, besides the manner of adding the cascaded switch, the terminal device may also insert another structure to achieve the effect of 1T4R in the embodiments of the disclosure.

As another example, the terminal device may achieve the purpose of supporting both 1T4R and 2T4R in a PA switching manner.

The PA switching manner is to implement switching from one transmission mode to another transmission mode by controlling turning on/off of the PAs on the transmitters of the terminal device, and the number of transmitters in the one transmission mode is different from the number of transmitters in the another transmission mode.

For example, the terminal device may include the first PA and the second PA, the first PA is connected with at least one first antenna, and the second PA is connected with at least one second antenna. The manner includes an operation as follows. Under a condition that the terminal device sends an uplink signal on the first antenna, the terminal device turns on the first PA and turns off the second PA. Alternatively, under a condition that the terminal device sends an uplink signal on the second antenna, the terminal device turns on the second PA and turns off the first PA.

Specifically, the terminal device, when sending an uplink signal through the antenna 1 or the antenna 2, may turn on the PA1 and turn off the PA2. The terminal device, when sending an uplink signal through the antenna 3 or the antenna 4, may turn on the PA2 and turn off the PA1.

Therefore, the signals may be sent in turns on the antenna 1 to the antenna 4 by controlling turning on/off of the PA1 and the PA2.

Optionally, the uplink signal may be an SRS.

Optionally, controlling turning on/off of the PA1 and the PA2 may be implemented by controlling turning on/off of power supplies. For example, the PA1 and the PA2 are powered by a first power supply and a second power supply respectively, and the terminal device may control the first power supply and the second power supply to be turned on or turned off through a baseband modem, thereby controlling turning on/off of the PA1 and the PA2.

Optionally, the manner that the terminal device supports both 1T4R and 2T4R is not limited in the embodiments of the disclosure. For example, the terminal device may support only the cascaded switch switching manner. For another example, the terminal device may support only PA switching manner. For another example, the terminal device supports both the cascaded switch switching manner and the PA switching manner.

In a condition that the terminal device supports both the cascaded switch switching manner and the PA switching manner, the terminal device may perform first transmission by the cascaded switch switching manner and perform next transmission by the PA switching manner.

Falling back from 2T4R to 1T4R may be implemented through the cascaded switch switching manner, but a manner of cascading two switches may increase the device cost. In addition, device insertion may increase device insertion loss, and increase of the device insertion loss may directly reduce the sensitivity of the receivers and further reduce the receiving performance of the terminal device.

In the PA switching manner, no additional switching switch is added, and problem of increasing the device insertion loss or reducing the receiving performance does not exist. However, in the PA switching manner, the modem is required to have a capability of dynamic switching between the two PAs. In addition, the two PAs are dynamically turned on or turned off due to a design of hardware architecture of the terminal, particularly a design of a power supply. For example, the two PAs are powered by independent power supplies, and then the two PAs may be turned on or turned off respectively.

Therefore, in the PA switching manner, whether 1T4R can be implemented through the PA switching manner depends on the capability of the terminal, and the capability not only includes a support of the modem for the PA switching manner, but also includes a support of the hardware architecture of the terminal for the PA switching manner.

When the terminal device supports the above PA switching, switching time of the two PAs should be considered. When the modem controls the two PAs to be sequentially turned on/off, one PA is turned off at first, and then the other PA is turned on. The two PAs have independent power supply circuits, and the power supply circuit may be understood as the power supply of the PA. Therefore, the switching time of the two PAs is a sum of time for turning on and turning off the two power supply circuits and time for turning on and turning off the PAs. For example, the switching time of the two PAs includes time for turning on a first power supply, time for turning off the second power supply, time for turning on the first PA and time for turning off the second PA. The switching time of the PAs may be in ms level and may not be ignored when the terminal is scheduled. Therefore, the terminal device, when reporting that it has the capability of supporting PA switching to the network device, is also required to report the required switching time to the network device. In this way, the network device may consider the PA switching time required by the terminal during scheduling. The network device may schedule an uplink signal according to the required PA switching time reported by the terminal device. For example, switching time for the SRS scheduled by the network device may not be shorter than the PA switching time required by the terminal.

As shown in FIG. 3, the terminal device may send uplink signals in turns on the antenna 1 to the antenna 4 through the PA switching manner. Since switching time of the terminal device between the antenna 1 and the antenna 2 is shorter than switching time between the antenna 2 and the antenna 3, in order for ensuring that there is enough time for transmission of the terminal device on each antenna, the terminal device may report maximum time required by switching, for example, the time required by switching from the antenna 2 to the antenna 3. Time required by switching from the antenna 2 to the antenna 4 may include time for turning off the power supply circuit of the PA1, time for turning off the switch of the PA1, time for turning on the power supply circuit of the PA2 and time for turning on the switch of the PA2. The terminal device may report the switching time to the network device, and the network device may reasonably schedule uplink transmission for the terminal according to the switching time.

Optionally, the terminal device may transmit the time required by PA switching together with the capability of supporting PA switching. For example, the terminal device may send first information to the network device, the first information indicates that a switching manner supported by the terminal device is PA switching and a performance parameter value corresponding to PA switching, and the performance parameter value includes the time required by PA switching of the terminal device.

Alternatively, the terminal device may also send time required by PA switching after sending information about the switching manner supported by the terminal device is PA switching, which is not limited in the embodiments of the disclosure.

From the above, considering application conditions of the above two manners, when the terminal device has the capability of supporting both 2T4R and 1T4R, the terminal device may report capability or condition of supporting 1T4R to the network device, and the network device determines whether the terminal device adopts the 1T4R manner to send the uplink signal.

From the above, transmission mode switching of the terminal device may have the following problems.

For a part of terminal devices, the terminal devices may not support switching of transmission scenarios. For example, some terminal devices may not be switched from 2T4R to 1T2R. For example, for the above-described PA switching manner, some terminal devices may not support the PA switching manner.

For a part of terminal devices, the terminal devices may perform switching of scenarios, but switching of the scenarios may bring the problems of reduction of reception performance or transmission performance and the like. For example, for the above-described cascaded switch switching manner, some terminal devices may support switching from 2T4R to 1T4R after device insertion, but introduction of other devices may increase the device insertion loss. Increase of the device insertion loss may reduce the sensitivity of the receivers and influence the receiving performance.

Therefore, in view of the above-described conditions, how the terminal device send or receive signals to ensure good communication between the terminal device and the network device becomes a problem urgent to be solved.

Therefore, the embodiments of the disclosure provide a reporting method, which is favorable for ensuring good communication between the terminal device and the network device.

FIG. 5 illustrates a wireless communication method provided in an embodiment of the disclosure. The method in FIG. 5 includes an operation S410.

In S410, a terminal device sends first information to a network device. The first information indicates a switching manner supported by the terminal device and/or a performance parameter value corresponding to the supported switching manner, the switching manner indicates a manner for switching the terminal device from one transmission mode to another transmission mode, and the transmission mode indicates the number of transmitters and the number of receivers used by the terminal device.

FIG. 6 illustrates a wireless communication method provided in an embodiment of the disclosure. The method in FIG. 6 includes an operation S510.

In S510, a network device receives first information sent by a terminal device. The first information indicates a switching manner supported by the terminal device and/or a performance parameter value corresponding to the supported switching manner, the switching manner indicates a manner for switching the terminal device from one transmission mode to another transmission mode, and the transmission mode indicates the number of transmitters and the number of receivers used by the terminal device.

According to the technical solutions provided in the embodiments of the disclosure, the terminal device may support multiple transmission modes, so that the terminal device may flexibly select a transmission mode in processes of sending an uplink signal and/or receiving a downlink signal. In addition, the terminal device may report the switching manner for switching a transmission mode and/or a performance parameter value corresponding to the switching manner to the network device, so that the network device may optimize scheduling of the terminal device according to reporting of the terminal device.

The method in FIG. 5 and the method in FIG. 6 may be applied to the following description. For convenient description, the terminal device and the network device are combined for description.

The performance parameter value may be an insertion loss value.

Optionally, the first information may indicate a switching manner, for example, indicating that the terminal device adopts a dynamic PA switching manner, or indicating that the terminal device adopts a cascaded switch switching manner or indicating that the terminal device adopts both the dynamic PA switching manner and the cascaded switch switching manner.

In addition, the dynamic PA switching manner and the cascaded switch switching manner may also implicitly indicate a switching mode of the terminal device. The switching mode may indicate which transmission the terminal device is switched from, and which transmission mode the terminal device is switched to. For example, the switching mode may implicitly indicate that the terminal device is switched from a 2T4R transmission mode to a 1T4R transmission mode.

In the embodiments of the disclosure, besides the above-described dynamic PA switching manner and cascaded switch switching manner, another switching manner may also be adopted.

The terminal device may also report the adopted switching manner and the switching mode to the network device through the first information. That is, the terminal device reports the switching mode to the network device while reporting the switching manner.

The terminal device reports more contents to the network device, which is not limited in the embodiments of the disclosure.

As an example, the terminal device may report only the supported switching manner. For example, the terminal device may report that the PA switching manner is supported, or the terminal device reports that the cascaded switch switching manner is supported.

As another example, the terminal device may report only an insertion loss value caused by the supported switching manner. For example, the terminal device may report only the insertion loss value, for example, the insertion loss value is 0 dB, 2 dB or 5 dB. In addition, the insertion loss value may implicitly indicate to the network device that the terminal device supports the cascaded switch switching manner.

As another example, the terminal device may report the supported switching manner while reporting the insertion loss value caused by the supported switching manner. For example, the terminal device may report that the adopted switching manner is the cascaded switch switching manner and report the insertion loss value caused by the cascaded switch switching manner, for example, the insertion loss value is 0 dB, dB or 5 dB.

As another example, the terminal device may report the performance parameter value, the performance parameter value may include multiple insertion loss values, and the insertion loss values have one-to-one correspondences with antennas on multiple transmitters. For example, the performance parameter value may include four insertion loss values, and the four insertion loss values may correspond to an antenna 1 to an antenna 4 in FIG. 4 according to one-to-one correspondences. The antennas on the multiple transmitters may be understood as antenna ports, and the insertion loss values corresponding to the antenna ports are loss added due to signal sending of the terminal device on different antennas after a cascade switch 3 is added. For example, the insertion loss value of the antenna 1 is signal loss increased by signal transmission through the antenna 1 after the cascade switch 3 is added as compared with a condition that no cascade switch 3 is added.

As shown in FIG. 4, after the cascade switch 3 is inserted, the insertion loss value of the antenna port may be correspondingly increased. Considering that insertion loss values of different antenna ports may be different after insertion of the switch 3, the terminal device may report the insertion loss value corresponding to each antenna port to the network device. For example, the terminal device may report the insertion loss values of the antenna port 1 to the antenna port 4 to the network device respectively. Then, the network device may reasonably schedule the terminal device according to the insertion loss values reported by the terminal device. For example, the network device may preferentially schedule the antenna port having a relatively low insertion loss value for transmission, thereby ensuring the transmission efficiency.

The terminal device may report the insertion loss values according to a sequence of the antenna ports. For example, the insertion loss values of the antenna port 1 to the antenna port 4 are 1 dB, 1 dB, 3 dB and 6 dB respectively. Herein, the terminal may report the four loss insertion values corresponding to the four different antenna ports respectively. For example, the first information may include multiple bits, and the multiple bits are configured to carry the multiple insertion loss values. For example, the first information may include four bits, and each bit corresponds to an insertion loss value, that is, each bit corresponds to the insertion loss value of an antenna port. The network device, after receiving the multiple bits, may determine the antenna having the insertion loss value to which each bit corresponds. Alternatively, three bits may also be used to indicate an insertion loss value corresponding to one antenna port. For the terminal device including the four antenna ports, 12 bits are required to indicate the insertion loss values, every three bits of which corresponds to an antenna port. A specific bit number for indicating the insertion loss value corresponding to one antenna port may be determined according to a magnitude of the insertion loss value. If the insertion loss value of each antenna port in the terminal device is less than 8 dB, three bits may be used to indicate the insertion loss value corresponding to one antenna port. If the insertion loss value of each antenna port in the terminal device is greater than 8 dB, more than three bits may be used to indicate the insertion loss value corresponding to one antenna port.

Of course, if insertion loss values of multiple antenna ports in the terminal device are identical, the terminal device may report only one insertion loss value, or, the terminal device may also report the insertion loss values of the multiple antenna ports according to a sequence of the antenna ports respectively, which is not limited in the embodiments of the application.

Optionally, the terminal device may report in a bit indication manner. For example, when a value of a bit is 0, it is indicated that the PA switching manner is supported. When the value of the bit is 1, it is indicated that the cascaded switch switching manner is supported.

Optionally, the terminal device may directly report any one of the abovementioned reporting contents or any combination of the contents to the network device. Alternatively, the terminal device, after receiving reporting indication information sent by the network device, reports to the network device. For example, the terminal device may report the insertion loss value to the network device, and when the insertion loss value is 0, it is implicitly indicated that the terminal device does not adopt the cascaded switch switching manner. The network device may send the reported indication information to the terminal device to indicate the terminal device to report whether the dynamic PA switching manner is supported. The terminal device, after receiving the reporting indication information, reports to the network device.

It is to be noted that the condition that the terminal device reports the insertion loss value is only an example, and the terminal device may also report a performance reduction degree. For example, the terminal device may report a sensitivity fallback degree or report a power fallback degree, etc.

Optionally, the terminal device may independently report to the network device that the terminal device has a capability of supporting the dynamic PA switching. The dynamic PA switching may be associated with the 1T4R transmission mode and may also be independently reported. For example, only a power saving capability or power consumption reduction capability is reported to the network device. In some cases, the terminal device may turn off a PA and use only one PA for sending.

The antenna for reporting of the terminal device is not limited in the embodiments of the disclosure. For example, as shown in FIG. 2, the terminal device may report through the main antenna 1, and the terminal device may also report through another antenna. For example, as shown in FIG. 3, the terminal device may report through the main antenna 1 and/or the main antenna 3, or other antenna. The terminal device may report through only the antenna 1, or only the antenna 3, or both the antenna 1 and the antenna 3.

Optionally, the insertion loss value reported by the terminal device may be an actual insertion loss value of the terminal device, and may also be an additional insertion loss value. The additional insertion loss value refers to a difference value between the actual insertion loss value of the terminal device and a predefined insertion loss value.

The actual insertion loss value may be an original insertion loss value. When the terminal device may be switched from one transmission mode to another transmission mode due to insertion of a certain device, a ratio of signal receiving power in the another transmission mode to receiving power in the one transmission mode in dB may be called the original insertion loss value or the actual insertion loss value.

For example, when the insertion loss value, generated by insertion of the device, of the terminal device is 5 dB, the terminal device may directly report 5 dB to the network device. When the insertion loss value reported by the terminal device is 0, it is indicated that the terminal device does not support the cascaded switch switching manner.

For another example, when the insertion loss value, generated by insertion of the device, of the terminal device is 5 dB and the predefined insertion loss value is 3 dB, the terminal device may report that the insertion loss value is 2 dB to the network device.

Of course, whether the insertion loss value reported by the terminal device is the actual insertion loss value or the additional insertion loss value may be indicated by the network device, or specified in a protocol or agreed between the terminal device and the network device.

Optionally, the terminal device may receive indication information sent by the network device, the indication information is configured to indicate a third transmission mode adopted by the terminal device for signal transmission, and the third transmission mode is transmission through one transmitting antenna and four receiving antennas, or transmission through one transmitting antenna and two receiving antennas or transmission through two transmitting antennas and four receiving antennas.

In other words, the indication information may be configured to indicate a fallback manner of the terminal device. For example, the indication information may indicate that the terminal device is fallen back to a 1T4R scenario or fallen back to a 1T2R scenario.

The information reported by the terminal device may provide a reference for the network device to determine a fallback manner of the terminal device.

For example, when the insertion loss value reported to the network device by the terminal device is 0 dB, it is indicated that the terminal device does not adopt the cascaded switch switching manner. Meanwhile, when the terminal device reports that the dynamic PA switching manner is supported, the network device may indicate that the terminal device is fallen back from 2T to 1T. That is, a manner of turning off one PA may be used, to achieve the purpose of saving power.

Optionally, when the network device requires the terminal device to send an SRS, the network device may also instruct the terminal device to send the SRS in a 1T4R manner, that is, the terminal device may send the SRS on four receivers in turns.

For another example, when an insertion loss value of 0 dB is reported to the network device by the terminal device, it is indicated that the terminal device does not adopt the cascaded switch switching manner. Also, in a condition that the terminal device reports that it does not support the dynamic PA switching manner, the terminal device turns off one PA to save power. In such case, the terminal device may fall back to the 1T2R scenario.

Optionally, when the network device requires the terminal device to send an SRS, the terminal device may only adopt the 1T2R transmission mode to send the SRS.

Optionally, in some conditions, the network device may also send second information to indicate that the terminal device cannot fall back, that is, the terminal device may only adopt the 2T4R manner for signal transmission.

Therefore, according to the technical solutions provided in the embodiments of the disclosure, the terminal device reports a supported switching mode and/or an insertion loss value caused by the supported switching mode to the network device, which is favorable for the network device to determine a transmission mode adopted by the terminal device for signal transmission, and further for ensuring good communication between the terminal device and the network device.

Optionally, the switching mode may be switching from 2T to 1T and may also be switching from 4R to 2R.

Optionally, the network device may send second information to the terminal device, and the second information is configured to indicate a transmission mode adopted by the terminal device for signal transmission.

Optionally, the transmission mode indicated by the second information corresponds to two transmitters and four receivers, or, the transmission mode indicated by the second information corresponds to one transmitter and two receivers, or, the transmission mode indicated by the second information corresponds to one transmitter and four receivers.

Optionally, the transmission mode is used in a time division duplex mode, the same multiple antennas are used for the transmitter and the receiver of the terminal device. The terminal device adopts a part of the multiple antennas simultaneously for sending, and the terminal device adopts the multiple antennas simultaneously for reception.

A manner that the network device indicates the switching mode adopted by the terminal device is not limited in the embodiments of the disclosure.

As an example, the network device may directly indicate a fallback mode adopted by the terminal device through signaling. For example, the indication information may indicate whether the terminal device adopts 1T or 2T and/or may also indicate whether the terminal device adopts 2R or 4R.

Optionally, the signaling may be Radio Resource Control (RRC) signaling.

As another example, the network device may also implicitly indicate the transmission mode adopted by the terminal device through at least one of the following information about: sensitivity fallback in a preset range, power fallback in a preset range, whether more than a first number rank uplink MIMO transmission may be scheduled in a predefined time period, or whether more than a second number rank downlink MIMO transmission may be scheduled in a predefined time period.

Optionally, the first number and the second number may be 2.

A content of the second indication information will be specifically described below. It is to be understood that the content of the second indication information may be a combination of the following contents.

For example, the indication information includes information about sensitivity fallback in the preset range, and is configured to indicate that the terminal device is allowed to receive a signal indicating sensitivity fallback in the preset range.

When the terminal device falls back from 4R to 2R, a certain level of sensitivity fallback may occur. If the level of sensitivity fallback does not exceed a preset range, it is indicated that the terminal device may fall back from 4R to 2R. If the level of sensitivity fallback exceeds the preset range, it is indicated that the terminal device may not fall back from 4R to 2R.

For another example, the indication information includes information about whether more than the first number rank uplink MIMO transmission may be scheduled in the predefined time period, and is configured to indicate whether the terminal device may receive more than the first number rank downlink MIMO transmission in a certain time period. Optionally, the first number may be 2.

If the indication information indicates that the terminal device may not receive more than 2 rank downlink MIMO transmission in a certain time period, it is indicated that the terminal device may fall back from 4R to 2R. If the indication information indicates that the terminal device may receive more than 2 rank downlink MIMO transmission in a certain time period, it is indicated that the terminal device may not fall back from 4R to 2R.

For another example, the indication information includes information about power fallback in a preset range, and is configured to indicate that the terminal device is allowed to receive power fallback in the preset range.

When the terminal device falls back from 2T to 1T, a certain level of power fallback occurs in the terminal device. If the level of the power fallback does not exceed a preset range, it is indicated that the terminal device may fall back from 2T to 1T. If the level of the power fallback exceeds the preset range, it is indicated that the terminal device may not fall back from 2T to 1T.

For another example, the indication information includes information whether more than the second number rank downlink MIMO transmission may be scheduled in a predefined time period, and is configured to indicate whether the terminal device may receive more than 2 rank uplink MIMO transmission in a certain time period. Optionally, the second number may be 2.

If the indication information indicates that the terminal device may not receive more than 2 rank uplink MIMO transmission in the certain time period, it is indicated that the terminal device may fall back from 2T to 1T. If the indication information indicates that the terminal device may receive more than 2 rank uplink MIMO transmission in the certain time period, it is indicated that the terminal device may not fall back from 2T to 1T.

It is to be noted that the above contents of the second indication information may be mutually combined.

For example, the condition of switching from 2T4R is described above, which is not limited in the embodiments of the disclosure. For example, the terminal device may be switched from 4T4R or switched from 2T6R.

FIG. 7 illustrates a method for sending an uplink signal by a terminal device according to an embodiment of the disclosure. The method in FIG. 7 includes operation S610.

The terminal device includes a first PA and a second PA, the first PA is connected with at least one first antenna, and the second PA is connected with at least one second antenna.

In S610, under a condition that the terminal device sends an uplink signal on the first antenna, the terminal device turns on the first PA and turns off the second PA.

Alternatively, under a condition that the terminal device sends an uplink signal on the second antenna, the terminal device turns on the second PA and turns off the first PA.

Optionally, the uplink signal is an SRS, the terminal device operates in a TDD mode, and the terminal device adopts the same multiple antennas for uplink transmission and downlink transmission. The terminal device adopts a part of the multiple antennas for the same uplink transmission, and the terminal device adopts all of the multiple antennas for the same downlink reception.

Optionally, the terminal device includes a first power supply and a second power supply, the first power supply supplies power to the first PA, and the second power supply supplies power to the second PA.

The operation that the terminal device turns on the first PA and turns off the second PA includes the following operation.

The terminal device connects the first power supply and disconnects the second power supply.

The operation that the terminal device turns on the second PA and turns off the first PA includes the following operation.

The terminal device connects the second power supply and disconnects the first power supply.

The method for sending an uplink signal by the terminal device in FIG. 7 may be applied to the above-described contents, specifically to the abovementioned dynamic PA switching manner.

It is to be understood that, in various embodiments of the disclosure, magnitudes of sequence numbers of the above processes does not mean an execution sequence and the execution sequence of the processes should be determined by functions and internal logics thereof, and should not form any limit to an implementation process of the embodiments of the disclosure.

The wireless communication method according to the embodiments of the disclosure is described above in detail, and a wireless communication device according to the embodiments of the disclosure will be described below in combination with FIG. 8 and FIG. 10. The technical characteristics described in the method embodiments are applied to the following device embodiments.

FIG. 8 is a schematic block diagram of a terminal device 700 according to an embodiment of the disclosure. As shown in FIG. 8, the terminal device 700 includes a communication unit 710.

The communication unit 710 is configured to send first information to a network device. The first information indicates a switching manner supported by the terminal device 700 and/or a performance parameter value corresponding to the supported switching manner. The switching manner indicates a manner for switching the terminal device 700 from one transmission mode to another transmission mode, and the transmission mode indicates the number of transmitters and the number of receivers used by the terminal device 700.

Optionally, in the embodiment of the disclosure, the supported switching manner includes the following switching manner using a following manner.

Switching from one transmission mode to another transmission mode is implemented by controlling to turning on/off PAs on transmitters of the terminal device 700, and the number of transmitters in one transmission mode is different from the number of transmitters in another transmission mode.

Optionally, in the embodiment of the disclosure, the supported switching manner includes a switching manner using a following manner.

A manner of controlling conducting/non-conducting between a first PA in at least two PAs on the transmitters of the terminal device 700 and an antenna on the transmitters is used to implement switching from one transmission mode to another transmission mode. The first PA is connected to antennas on multiple transmitters, the antennas of at least part of the multiple transmitters connected with the first PA includes an antenna of a transmitter connected with a second PA in the at least two PAs, and the number of transmitters in one transmission mode is different from the number of transmitters in another transmission mode.

Optionally, in the embodiment of the disclosure, the performance parameter value is an insertion loss value.

Optionally, in the embodiment of the disclosure, the insertion loss value is an actual insertion loss value of the terminal device 700.

Optionally, in the embodiment of the disclosure, the insertion loss value is an additional insertion loss value, and the additional insertion loss value refers to a difference value between the actual insertion loss value of the terminal device 700 and a predefined insertion loss value.

Optionally, in the embodiment of the disclosure, the predefined insertion loss value is 3 dB.

Optionally, in the embodiment of the disclosure, the one transmission mode includes two transmitters and four receivers, and another transmission mode includes one transmitter and four receivers.

Optionally, in the embodiment of the disclosure, the communication unit 710 is further configured to receive second information sent by the network device based on the first information. The second information is configured to indicate a transmission mode used by the terminal device 700 for signal transmission.

The terminal device 700 uses the transmission mode indicated by the second information for signal transmission.

Optionally, in the embodiment of the disclosure, the transmission mode indicated by the second information is different from another transmission mode.

Optionally, in the embodiment of the disclosure, the transmission mode indicated by the second information is the same as another transmission mode.

Optionally, in the embodiment of the disclosure, the second information is carried in RRC signaling.

Optionally, in the embodiment of the disclosure, the second information includes at least one of the following information about: sensitivity fallback in a preset range, power fallback in a preset range, whether more than a first number rank uplink MIMO transmission may be scheduled in a predefined time period, or whether more than a second number rank downlink MIMO transmission may be scheduled in a predefined time period.

Optionally, in the embodiment of the disclosure, the first number is 2, and the second number is 2.

Optionally, in the embodiment of the disclosure, the transmission mode indicated by the second information corresponds to two transmitters and four receivers.

Alternatively, the transmission mode indicated by the second information corresponds to one transmitter and two receivers.

Alternatively, the transmission mode indicated by the second information corresponds to one transmitter and four receivers.

Optionally, in the embodiment of the disclosure, the transmission mode is used in a time division duplex mode, the same multiple antennas are adopted for the transmitters and receivers of the terminal device 700. The terminal device 700 adopts a part of the multiple antennas simultaneously for transmission, and the terminal device 700 adopts the multiple antennas simultaneously for reception.

Optionally, in the embodiment of the disclosure, the transmitter of the terminal device 700 is used to transmit an SRS.

It is to be understood that the terminal device 700 may correspond to the terminal device in the method shown in FIG. 5, and may implement the corresponding operations of the terminal device in the method shown in FIG. 5, which is not described repeatedly here anymore for simplicity.

FIG. 9 is a schematic block diagram of a network device 800 according to an embodiment of the disclosure. As shown in FIG. 9, the network device 800 includes a communication unit 810.

The communication unit 810 is configured to receive first information sent by a terminal device. The first information indicates a switching manner supported by the terminal device and/or a performance parameter value corresponding to the supported switching manner. The switching manner indicates a manner for switching the terminal device from one transmission mode to another transmission mode, and the transmission mode indicates the number of transmitters and the number of receivers used by the terminal device.

Optionally, in the embodiment of the disclosure, the supported switching manner includes a switching manner using a following manner. A manner of controlling turning on/off of PAs on transmitters of the terminal device is used to implement a switching from one transmission mode to another transmission mode, and the number of transmitters in one transmission mode is different from the number of transmitters in another transmission mode.

Optionally, in the embodiment of the disclosure, the supported switching manner includes a switching manner using a following manner. A manner of controlling conducting/non-conducting between a first PA in at least two PAs on the transmitters of the terminal device and an antenna on the transmitters is used to implement switching from one transmission mode to another transmission mode. The first PA is connected to antennas on multiple transmitters, the antennas of at least part of the multiple transmitters connected with the first PA includes an antenna of a transmitter connected with a second PA in the at least two PAs, and the number of transmitters in one transmission mode is different from the number of transmitters in another transmission mode.

Optionally, in the embodiment of the disclosure, the performance parameter value is an insertion loss value.

Optionally, in the embodiment of the disclosure, the insertion loss value is an actual insertion loss value of the terminal device.

Optionally, in the embodiment of the disclosure, the insertion loss value is an additional insertion loss value, and the additional insertion loss value refers to a difference value between the actual insertion loss value of the terminal device and a predefined insertion loss value.

Optionally, in the embodiment of the disclosure, the predefined insertion loss value is 3 dB.

Optionally, in the embodiment of the disclosure, the one transmission mode includes two transmitters and four receivers, and the another transmission mode includes one transmitter and four receivers.

Optionally, in the embodiment of the disclosure, the communication unit 810 is further configured to send second information to the terminal device according to the first information. The second information is configured to indicate a transmission mode used by the terminal device for signal transmission.

Optionally, in the embodiment of the disclosure, the transmission mode indicated by the second information is different from another transmission mode.

Optionally, in the embodiment of the disclosure, the transmission mode indicated by the second information is the same as another transmission mode.

Optionally, in the embodiment of the disclosure, the second information is carried in RRC signaling.

Optionally, in the embodiment of the disclosure, the second information includes at least one of the following information about: sensitivity fallback in a preset range, power fallback in a preset range, whether more than a first number rank uplink MIMO transmission may be scheduled in a predefined time period, or whether more than a second number rank downlink MIMO transmission may be scheduled in a predefined time period.

Optionally, in the embodiment of the disclosure, the first number is 2, and the second number is 2.

Optionally, in the embodiment of the disclosure, the transmission mode indicated by the second information corresponds to two transmitters and four receivers.

Alternatively, the transmission mode indicated by the second information corresponds to one transmitter and two receivers.

Alternatively, the transmission mode indicated by the second information corresponds to one transmitter and four receivers.

Optionally, in the embodiment of the disclosure, the transmission mode is used in a time division duplex mode, the same multiple antennas are used for the transmitters and receivers of the terminal device. The terminal device adopts a part of the multiple antennas simultaneously for transmission, and the terminal device adopts the multiple antennas simultaneously for reception.

Optionally, in the embodiment of the disclosure, the transmitter of the terminal device is used to transmit an SRS.

It is to be understood that the network device 800 may correspond to the network device in the method shown in FIG. 6, and may implement the corresponding operations of the network device in the method shown in FIG. 6, which is not described repeatedly here anymore for simplicity.

Figure 10:
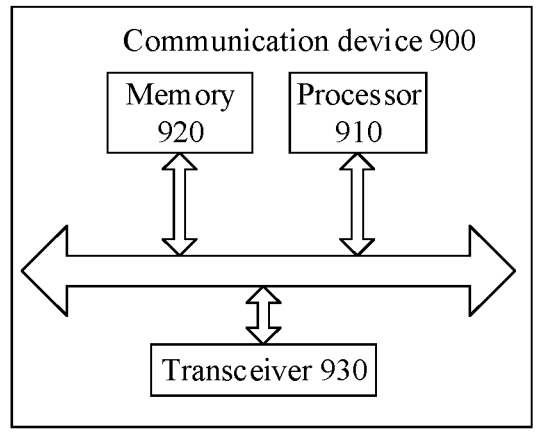
FIG. 10 is a schematic block diagram of a communication device according to an embodiment of the disclosure.

FIG. 10 is a schematic structure diagram of a communication device 900 according to an embodiment of the disclosure. The communication device 900 shown in FIG. 10 includes a processor 910, and the processor 910 may call and run a computer program in a memory to implement the method in the embodiments of the disclosure.

Optionally, as shown in FIG. 10, the communication device 900 may further include a memory 920. The processor 910 may call and run the computer program in the memory 920 to implement the method in the embodiments of the disclosure.

The memory 920 may be a separate device independent of the processor 910 and may also be integrated into the processor 910.

Optionally, as shown in FIG. 10, the communication device 900 may further include a transceiver 930, and the processor 910 may control the transceiver 930 to communicate with another device, specifically sending information or data to the other device or receiving information or data sent by the other device.

The transceiver 930 may include a transmitter and a receiver. The transceiver 930 may further include antenna, and the number of antennas may be one or more.

Optionally, the communication device 900 may be the network device of the embodiments of the disclosure, and the communication device 900 may implement corresponding flows implemented by the network device in each method of the embodiments of the disclosure, which is not described repeatedly here anymore for simplicity.

Optionally, the communication device 900 may be the terminal device of the embodiments of the disclosure, and the communication device 900 may implement corresponding flows implemented by the terminal device in each method of the embodiments of the disclosure, which is not described repeatedly here anymore for simplicity.

The terminal device shown in FIG. 10 may further include a first PA, a second PA, at least one first antenna, at least one second antenna, a processor and a memory. The first PA is connected with the at least one first antenna, the second PA is connected with the at least one second antenna, the memory is configured to store a computer program, and the processor is configured to call and run the computer program stored in the memory to execute the above-described method shown in FIG. 7.

Optionally, the terminal device may further include a first power supply and a second power supply. The first power supply supplies power to the first PA, and the second power supply supplies power to the second PA.

Figure 11:
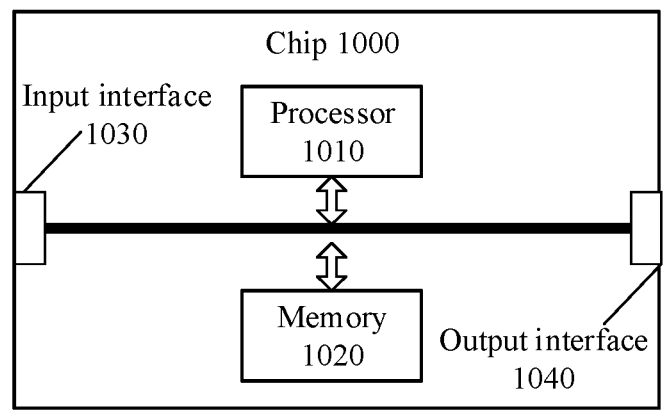
FIG. 11 is a schematic block diagram of a chip according to an embodiment of the disclosure.

FIG. 11 is a schematic structure diagram of a chip according to an embodiment of the disclosure. The chip 1000 shown in FIG. 11 includes a processor 1010, and the processor 1010 may call and run a computer program in a memory to implement the method in the embodiments of the disclosure.

Optionally, as shown in FIG. 11, the chip 1000 may further include a memory 1020. The processor 1010 may call and run a computer program in the memory 1020 to implement the method in the embodiments of the disclosure.

The memory 1020 may be a separate device independent of the processor 1010 and may also be integrated into the processor 1010.

Optionally, the chip 1000 may further include an input interface 1030. The processor 1010 may control the input interface 1030 to communicate with another device or chip, specifically acquiring information or data sent by another device or chip.

Optionally, the chip 1000 may further include an output interface 1040. The processor 1010 may control the output interface 1040 to communicate with another device or chip, specifically outputting information or data sent by another device or chip.

Optionally, the chip may be applied to the terminal device of the embodiments of the disclosure, and the chip may implement corresponding flows implemented by the terminal device in each method of the embodiments of the disclosure, which is not described repeatedly here anymore for simplicity.

Optionally, the chip may be applied to the network device of the embodiments of the disclosure, and the chip may implement corresponding flows implemented by the network device in each method of the embodiments of the disclosure, which is not described repeatedly here anymore for simplicity.

It is to be understood that the chip mentioned in the embodiment of the disclosure may also be called a system-level chip, a system chip, a chip system or a system on chip, etc.

It is to be understood that the processor in the embodiment of the disclosure may be an integrated circuit chip and has a signal processing capacity. In an implementation process, each step of the method embodiments may be completed by an integrated logical circuit of hardware in the processor or an instruction in a software form. The above processor may be a universal processor, a digital signal processor (DSP), an Application Specific Integrated Circuit (ASIC), a field programmable gate array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the method disclosed in combination with the embodiments of the disclosure may be directly embodied to be executed and implemented by a hardware decoding processor, or executed and implemented by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and implements the steps of the method in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include, but not limited to, memories of these and any other proper types.

Figure 12:
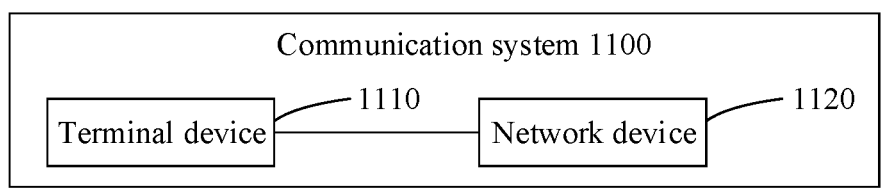
FIG. 12 is a schematic block diagram of a communication system according to an embodiment of the disclosure.

FIG. 12 is a schematic block diagram of a communication system 1100 according to an embodiment of the disclosure. As shown in FIG. 12, a communication system 1100 includes a terminal device 1110 and a network device 1120.

The terminal device 1110 may be configured to implement corresponding functions implemented by the terminal device in the above method, and the network device 1120 may be configured to implement corresponding functions implemented by the network device in the above method, which is not described repeatedly here anymore for simplicity.

The embodiments of the disclosure also provide a computer-readable storage medium, which is configured to store a computer program.

Optionally, the computer-readable storage medium may be applied to a terminal device in the embodiments of the disclosure, and the computer program enables a computer to execute corresponding flows implemented by the terminal device in each method of the embodiments of the disclosure, which is not described repeatedly here anymore for simplicity.

Optionally, the computer-readable storage medium may be applied to a network device in the embodiments of the disclosure, and the computer program enables a computer to execute corresponding flows implemented by the network device in each method of the embodiments of the disclosure, which is not described repeatedly here anymore for simplicity.

The embodiments of the disclosure further provide a computer program product, which includes a computer program instruction.

Optionally, the computer program product may be applied to a terminal device in the embodiments of the disclosure, and the computer program instruction enables the computer to execute corresponding flows implemented by the terminal device in each method of the embodiments of the disclosure, which is not described repeatedly here anymore for simplicity.

Optionally, the computer program product may be applied to a network device in the embodiments of the disclosure, and the computer program instruction enables a computer to execute corresponding flows implemented by the network device in each method of the embodiments of the disclosure, which is not described repeatedly here anymore for simplicity.

The embodiments of the disclosure also provide a computer program.

Optionally, the computer program may be applied to a terminal device in the embodiments of the disclosure, and the computer program runs in the computer to enable the computer to execute corresponding flows implemented by the terminal device in each method of the embodiments of the disclosure, which is not described repeatedly here anymore for simplicity.

Optionally, the computer program may be applied to a network device in the embodiments of the disclosure, and the computer program runs in a computer to enable the computer to execute corresponding flows implemented by the network device in each method of the embodiments of the disclosure, which is not described repeatedly here anymore for simplicity.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization should be considered to fall within the scope of the disclosure.

Those skilled in the art may clearly learn about that for specific operation processes of the system, device and unit described above, reference may be made to the corresponding processes in the above method embodiment, and will not be described repeatedly herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, the device or the units, and may be electrical and mechanical or adopt other forms.

The units described as separate parts may or may not be physically separated, and parts displayed as units may or may not be physical units, that is, may be located in the same place, or may also be distributed to multiple network units. A part or all of the units may be selected to achieve the purpose of the solutions of the embodiments according to a practical requirement.

In addition, functional units in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium. Based on such an understanding, an essential part of the technical solutions in the disclosure, a part of the technical solutions making contributions to the prior art, or a part of the technical solutions may be embodied in a form of a software product. The computer software product is stored in a storage medium and includes several instructions configured to enable a computer device (which may be a personal computer, a server, a network device or the like) to execute all or a part of the operations of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk and an optical disk.

The foregoing is only the specific embodiments of the disclosure, and the scope of protection of the disclosure is not limited thereto. Any variations or replacements easily appreciated by those skilled in the art within the technical scope disclosed by the disclosure shall fall within the scope of protection of the disclosure. Therefore, the scope of protection of the disclosure shall conform to the scope of protection of the claims.

The invention claimed is:

1. A wireless communication method, comprising:
sending, by a terminal device, first information to a network device, wherein the first information indicates at least one of a switching manner supported by the terminal device or a performance parameter value corresponding to the supported switching manner, the switching manner indicates a manner for switching between transmission modes by the terminal device, each of the transmission modes indicates a number of transmitters and a number of receivers used by the terminal device, and the performance parameter value comprises time required by switching a power amplifier (PA) by the terminal device.

2. The method of claim 1, wherein the supported switching manner comprises a switching manner using a following manner of:
controlling switching on/off of power amplifiers (PAs) on the transmitters of the terminal device, to implement switching from one transmission mode to another transmission mode, wherein a number of transmitters in the one transmission mode is different from a number of transmitters in the another transmission mode.

3. The method of claim 1, wherein the time required by switching the PA by the terminal device is a sum of time required by switching on and switching off power supply circuits and time required by switching on and switching off the PA.

4. The method of claim 1, wherein the supported switching manner comprises a switching manner using a following manner:
controlling conducting and non-conducting between a first PA in at least two PAs on the transmitters of the terminal device and an antenna on the transmitters, to implement switching from one transmission mode to another transmission mode, wherein the first PA is connected to antennas on a plurality of transmitters, antennas of at least part of the plurality of transmitters connected with the first PA comprise an antenna of a transmitter connected with a second PA in the at least two PAs, and a number of transmitters in the one transmission mode is different from a number of transmitters in the another transmission mode.

5. The method of claim 1, wherein the performance parameter value comprises an insertion loss value.

6. The method of claim 5, wherein the insertion loss value is an actual insertion loss value of the terminal device; or
wherein the insertion loss value is an additional insertion loss value, the additional insertion loss value is a difference value between an actual insertion loss value of the terminal device and a predefined insertion loss value.

7. The method of claim 6, wherein the predefined insertion loss value is 3 dB.

8. The method of claim 5, wherein the performance parameter value comprises a plurality of insertion loss values, and the plurality of insertion loss values have one-to-one correspondences with antennas on a plurality of transmitters.

9. The method of claim 8, wherein the first information comprises a plurality of bits, and the plurality of bits are configured to carry a plurality of insertion loss values.

10. The method of claim 1, further comprising:
receiving, by the terminal device, second information sent by the network device based on the first information, wherein the second information indicates a transmission mode used by the terminal device for signal transmission; and
performing, by the terminal device, signal transmission by using the transmission mode indicated by the second information.

11. The method of claim 10, wherein a transmission mode indicated by the second information is different from the another transmission mode, or
wherein the transmission mode indicated by the second information is identical with the another transmission mode, and wherein the second information is carried in Radio Resource Control (RRC) signaling.

12. The method of claim 10, wherein the second information comprises at least one of following information about:
sensitivity fallback in a preset range, power fallback in a preset range, whether more than a first number rank uplink Multiple-Input Multiple-Output (MIMO) transmission is scheduled in predefined time, or whether more than a second number rank downlink MIMO transmission is scheduled in a predefined time, wherein the first number is 2, and the second number is 2.

13. The method of claim 10, wherein the transmission mode indicated by the second information corresponds to two transmitters and four receivers; or
the transmission mode indicated by the second information corresponds to one transmitter and two receivers; or
the transmission mode indicated by the second information corresponds to one transmitter and four receivers.

14. A terminal device, comprising:
a memory configured to store a computer program;
a processor; and
a transceiver;
wherein the processor is configured to execute the computer program stored in the memory to control the transceiver to send first information to a network device, wherein the first information indicates at least one of a switching manner supported by the terminal device or a performance parameter value corresponding to the supported switching manner, the switching manner indicates a manner for switching between transmission modes by the terminal device, each of the transmission modes indicates a number of transmitters and a number of receivers used by the terminal device, and the performance parameter value comprises time required by switching a power amplifier (PA) by the terminal device.

15. The terminal device of claim 14, wherein the supported switching manner comprises a switching manner using a following manner:
controlling switching on/off of power amplifiers (PAs) on the transmitters of the terminal device, to implement switching from one transmission mode to another transmission mode, wherein a number of transmitters in the one transmission mode is different from a number of transmitters in the another transmission mode.

16. The terminal device of claim 15, wherein the one transmission mode comprises two transmitters and four receivers, and the another transmission mode comprises one transmitter and four receivers.

17. The terminal device of claim 14, wherein the supported switching manner comprises a switching manner using a following manner:
controlling conducting and non-conducting between a first PA in at least two PAs on the transmitters of the terminal device and an antenna on the transmitters, to implement switching from one transmission mode to another transmission mode, wherein the first PA is connected to antennas on a plurality of transmitters, antennas of at least part of the plurality of transmitters connected with the first PA comprise an antenna of a transmitter connected with a second PA in the at least two PAs, and a number of transmitters in the one transmission mode is different from a number of transmitters in the another transmission mode.

18. The terminal device of claim 14, wherein the transmission modes are used in a Time Division Duplex (TDD) mode, a plurality of same antennas are used for the transmitters and the receivers of the terminal device, the terminal device performs transmission by simultaneously using a part of the plurality of antennas, and the terminal device performs reception by simultaneously using the plurality of antennas, wherein the transmitters of the terminal device are configured to transmit a Sounding Reference Signal (SRS).

* * * * *